United States Patent
Filkins et al.

(10) Patent No.: US 12,158,597 B2
(45) Date of Patent: Dec. 3, 2024

(54) SYSTEMS AND METHODS FOR DIRECT LASER MELTING OF METALS USING NON-DIFFRACTING LASER BEAMS

(71) Applicant: General Electric Company, Schenectady, NY (US)

(72) Inventors: Robert John Filkins, Niskayuna, NY (US); Subhrajit Roychowdhury, Schenectady, NY (US); Juan Borja, Albany, NY (US); Thomas Adcock, Glenville, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/321,349

(22) Filed: May 22, 2023

(65) Prior Publication Data
US 2023/0305196 A1    Sep. 28, 2023

Related U.S. Application Data

(62) Division of application No. 16/288,512, filed on Feb. 28, 2019, now Pat. No. 11,686,889.

(51) Int. Cl.
*G02B 5/00* (2006.01)
*B22F 1/00* (2022.01)
(Continued)

(52) U.S. Cl.
CPC ............ *G02B 5/001* (2013.01); *B22F 1/00* (2013.01); *B22F 12/44* (2021.01); *B22F 12/49* (2021.01);
(Continued)

(58) Field of Classification Search
CPC ... B23K 26/0648; B33Y 10/00; B29C 64/153; B29C 64/268; B22F 10/20; B22F 1/0003; G02B 5/001; G02B 26/00
(Continued)

(56) References Cited

U.S. PATENT DOCUMENTS 5,543,251 A * 8/1996 Taylor ............... G03H 1/26
                                                           359/24
6,490,088 B1   12/2002 Rosen et al.
(Continued)

FOREIGN PATENT DOCUMENTS

CN       104816087 A    8/2015
CN       109590618 A    4/2019
(Continued)

OTHER PUBLICATIONS

Juodkazis et al., Thermal Effects in Three-Dimensional Recording by FEMTO/Nano-Second Pulses, Proc. of SPIE, vol. 6118, 2006, 12 Pages.
(Continued)

*Primary Examiner* — Janie M Loeppke
*Assistant Examiner* — Simpson A Chen
(74) *Attorney, Agent, or Firm* — Dority & Manning, P.A.

(57) ABSTRACT

A system includes a first group of optic lenses within a focusing unit positioned along the propagation direction of a collimated laser beam, the first group of optic lenses separated by a predetermined fixed distance. The first group of optic lenses in conjunction cause the collimated beam to form as an annular beam as it passes through the first group of optic lenses. An axicon lens located distal from the first group of optic lenses along the propagation direction, the axicon lens operable to bifurcate the annular beam into two deflected collimated beam sections, and the axicon lens having a focus that causes the two deflected collimated beam sections to merge at a distance distal from the axicon lens to create an interference pattern region.

10 Claims, 6 Drawing Sheets

(51) Int. Cl.
  *B22F 10/28* (2021.01)
  *B22F 10/36* (2021.01)
  *B22F 10/362* (2021.01)
  *B22F 12/44* (2021.01)
  *B22F 12/49* (2021.01)
  *B23K 26/06* (2014.01)
  *B29C 64/153* (2017.01)
  *B29C 64/268* (2017.01)
  *B33Y 10/00* (2015.01)

(52) U.S. Cl.
  CPC ........ *B23K 26/0648* (2013.01); *B29C 64/153* (2017.08); *B29C 64/268* (2017.08); *B33Y 10/00* (2014.12); *B22F 10/28* (2021.01); *B22F 10/36* (2021.01); *B22F 10/362* (2021.01)

(58) Field of Classification Search
  USPC .................................................... 219/121.65
  See application file for complete search history.

(56) References Cited

U.S. PATENT DOCUMENTS

| | | | |
|---|---|---|---|
| 6,972,906 B2 | 12/2005 | Hasman et al. | |
| 8,187,521 B2 | 5/2012 | Larsson et al. | |
| 9,522,426 B2 | 12/2016 | Das et al. | |
| 10,047,001 B2 | 8/2018 | West | |
| 2006/0091283 A1 | 5/2006 | Acker et al. | |
| 2012/0218558 A1* | 8/2012 | Cenko | A61B 5/0066 |
| | | | 356/450 |
| 2013/0172862 A1* | 7/2013 | Suckewer | A61B 18/20 |
| | | | 606/9 |
| 2016/0067827 A1 | 3/2016 | Zediker | |
| 2016/0167160 A1 | 6/2016 | Hellestam | |
| 2016/0167165 A1 | 6/2016 | Roch et al. | |
| 2016/0236279 A1 | 8/2016 | Ashton et al. | |
| 2017/0189991 A1 | 7/2017 | Gollier et al. | |
| 2018/0105451 A1 | 4/2018 | Wieland | |
| 2019/0270246 A1 | 9/2019 | Fujishima et al. | |
| 2020/0023583 A1* | 1/2020 | Hunze | B29C 64/277 |
| 2020/0039005 A1* | 2/2020 | Thomas | B23K 26/402 |
| 2020/0156189 A1 | 5/2020 | Rataj et al. | |
| 2020/0269500 A1 | 8/2020 | Pieger et al. | |
| 2021/0098973 A1* | 4/2021 | Gong | G02B 26/06 |

FOREIGN PATENT DOCUMENTS

| | | |
|---|---|---|
| JP | 20111/70052 A | 9/2011 |
| WO | WO2018/001846 A1 | 1/2018 |
| WO | WO2018/217277 A1 | 11/2018 |

OTHER PUBLICATIONS

Okunkova et al., Experimental Approbation of Selective Laser Melting of Powders by the use of Non-Gaussian Power Density Distributions, 8th International Conference on Photonic Technologies LANE 2014, Physics Procedia, vol. 56, 2014, 48-57.

Yu et al., Bessel Beam Generation Using a Segmented Deformable Mirror, Applied Optics, vol. 57, No. 16, Jun. 2018, 4677-4682.

* cited by examiner

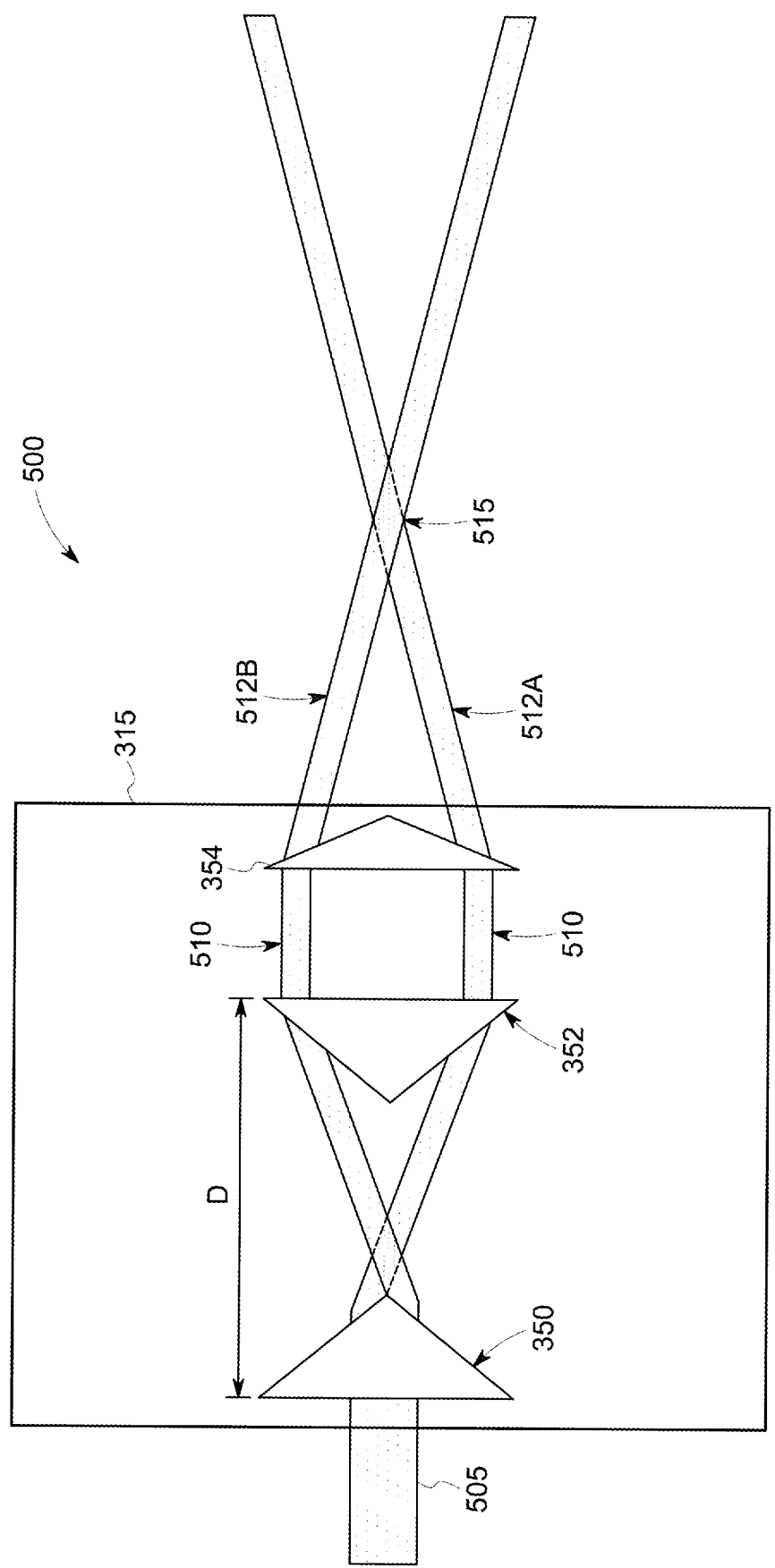

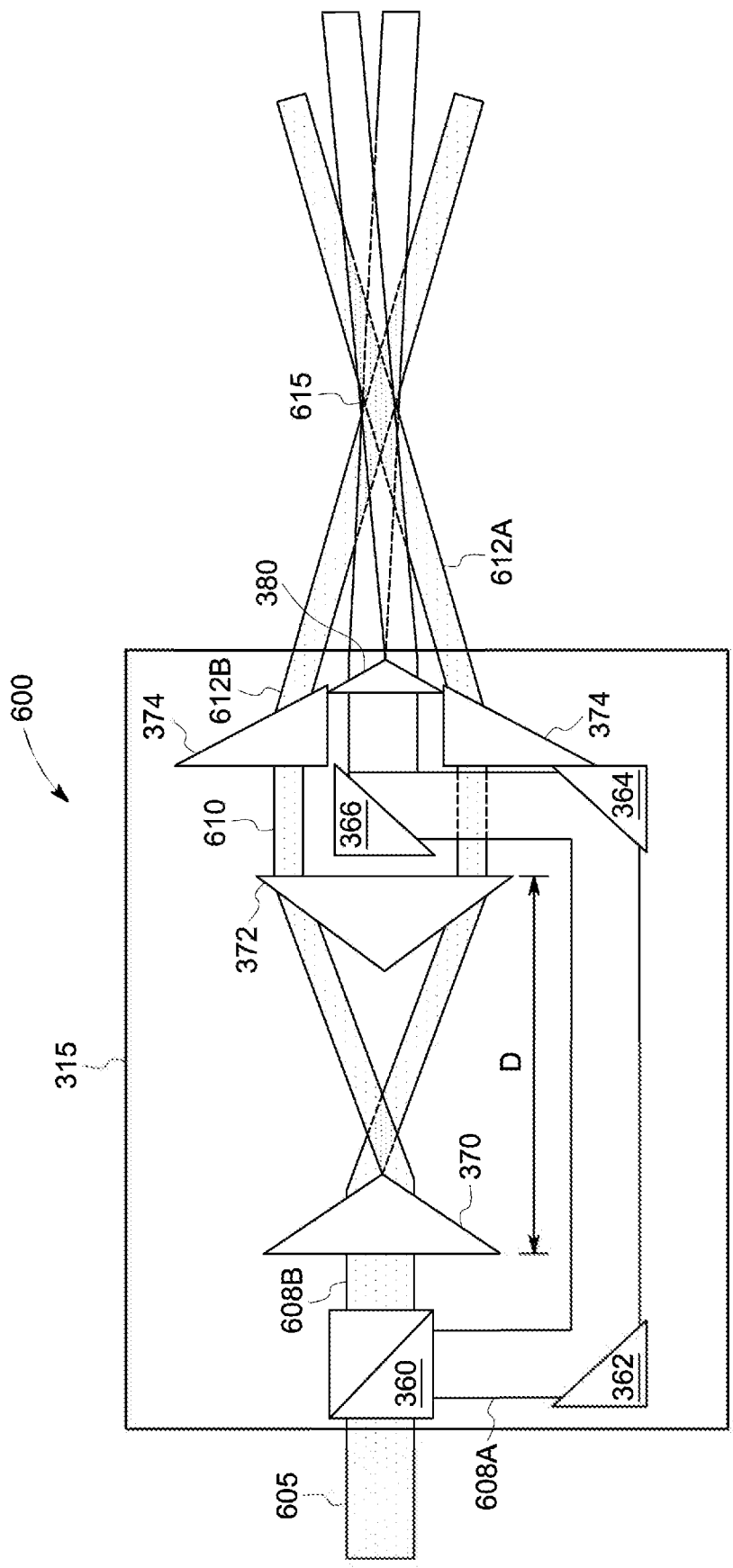

SYSTEMS AND METHODS FOR DIRECT LASER MELTING OF METALS USING NON-DIFFRACTING LASER BEAMS

PRIORITY INFORMATION

The present application claims priority to, and is a divisional application of, U.S. patent application Ser. No. 16/288,512 filed on Feb. 28, 2019, which is incorporated by reference herein in its entirety for all purposes.

BACKGROUND

Additive manufacturing machines perform additive manufacturing processes that use laser energy to fuse successive layers of powder bed material to build a three-dimensional (3D) part. A direct metal laser melting (DMLM) is one example of an additive manufacturing machine. For purposes of this disclosure, the terms "direct metal laser melting", "DMLM", and "additive manufacturing machine" are used interchangeably. Traditional spherical optics focuses the laser energy to a collimated, Gaussian beam shape, with an in-plane transverse profile and a sagittal focus intensity described by gaussian distribution functions. The physical extent of the distribution is determined by the curvature and fill-factor of the optical elements. This conventional approach to forming a Gaussian-focused beam for DMLM operations results in the beam's most stable part being limited to typically just a few millimeters in the beam propagation direction.

FIG. 1 schematically depicts conventional DMLM machine 100. Collimator 110 forms a parallel beam from laser light provided by laser source 105. Dynamic optics unit 112 contains optical elements that can are mechanically movable in relation to one another under the control of optical control and driver unit 120. Dynamic movement of the optical elements alters their focal length to refocus the laser beam as scanner 125 scans the beam in an x-y plane across powder bed 130. This refocusing during scanning operation is necessary in conventional additive manufacturing machines because of inherent error sources that singly or cumulatively can move the focus spot from the powder bed. F-Theta lens 127 is incorporated into conventional DMLM machines to provide a flatter field at the powder bed plane by adjusting the focal length during beam scanning to retain in-focus operation as the beam is swept across the scanner's field of view. FIG. 2 illustrates a depiction of laser beam 200 generated by conventional DMLM machines. Dynamic optic 115 can be repositioned under the control of driver unit 120 along the beam propagation (z) axis. Changes in the distance between dynamic optic 115 and focusing optic 118 causes a change in the beam width impinging on the focusing optic. This change in beam width alters the position of beam waist 210, which is the depth-of-focus for melting powder. Beam-waist length 220 along the z-axis is on the order of a few millimeters (in the range of about 2-5 mm). Dynamic movement of the optical elements can reposition the beam waist along the z-axis for consistent welding. This dynamic movement is necessary in conventional DMLM machines to negate errors introduced by thermal changes in the optical path, imprecise build plate movement, and inconsistent powder height. These errors can cumulatively move the laser spot along the z-axis about the length of the beam waist (e.g., about 2-5 mm), which moves the focus off the powder surface.

Providing a consistently sized laser spot over the entire powder bed (transverse to the beam) is a significant challenge in manufacturing, installing, and maintaining a laser-based powder bed consolidation machine (or DMLM 3D printer). The powder bed is typically in the range of 100 mm to 500 mm transverse to the beam and positioned distal from the laser scanner system in about a similar scale. Conventional approaches to maintain a focused spot size across the powder bed requires considerable tuning and software-based calibration to control lens position, beam width. To maintain an accurate, focused spot calibration files need to anticipate the physical extent of the build plate to apply adjustments to build plate height, fore/aft positions.

During manufacture and installation, technicians often make careful adjustments by hand to optomechanical components to correctly locate the laser beam relative to the build plate location. Despite best efforts, under conventional techniques the location of a laser beam's focal region relative to the build plate position will ultimately drifts due to mechanical manipulations of the system, temperature, run time, age of components, and vibration. As a result, conventional approaches require considerable regular calibration and/or adjustment is required to ensure that build quality is good.

What is missing from the art is an ability to generate a laser beam for DMLM additive manufacturing processes that has a focal spot range sufficiently deep enough to be invariant to these mechanical variations.

BRIEF DESCRIPTION OF THE DRAWINGS

FIG. 5 depicts a laser beam generated by an axicon focusing unit having a first set of optical elements in accordance with embodiments; and FIG. 6 depicts a laser beam generated by an axicon focusing unit having a second set of optical elements in accordance with embodiments.

DESCRIPTION

Figure 1:
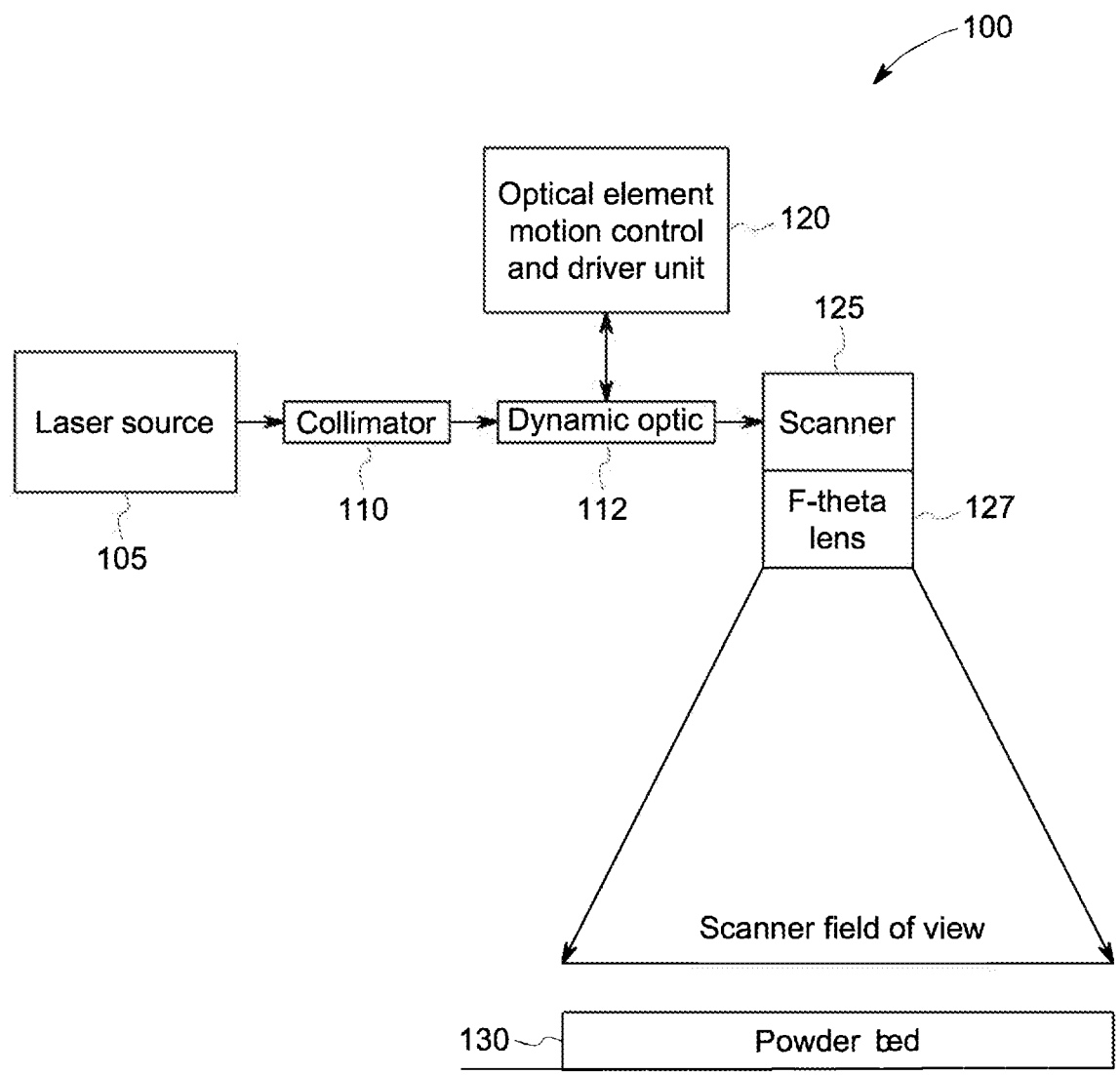
FIG. 1 schematically depicts a conventional DMLM machine that includes a conventional dynamic optics unit.
Figure 2:
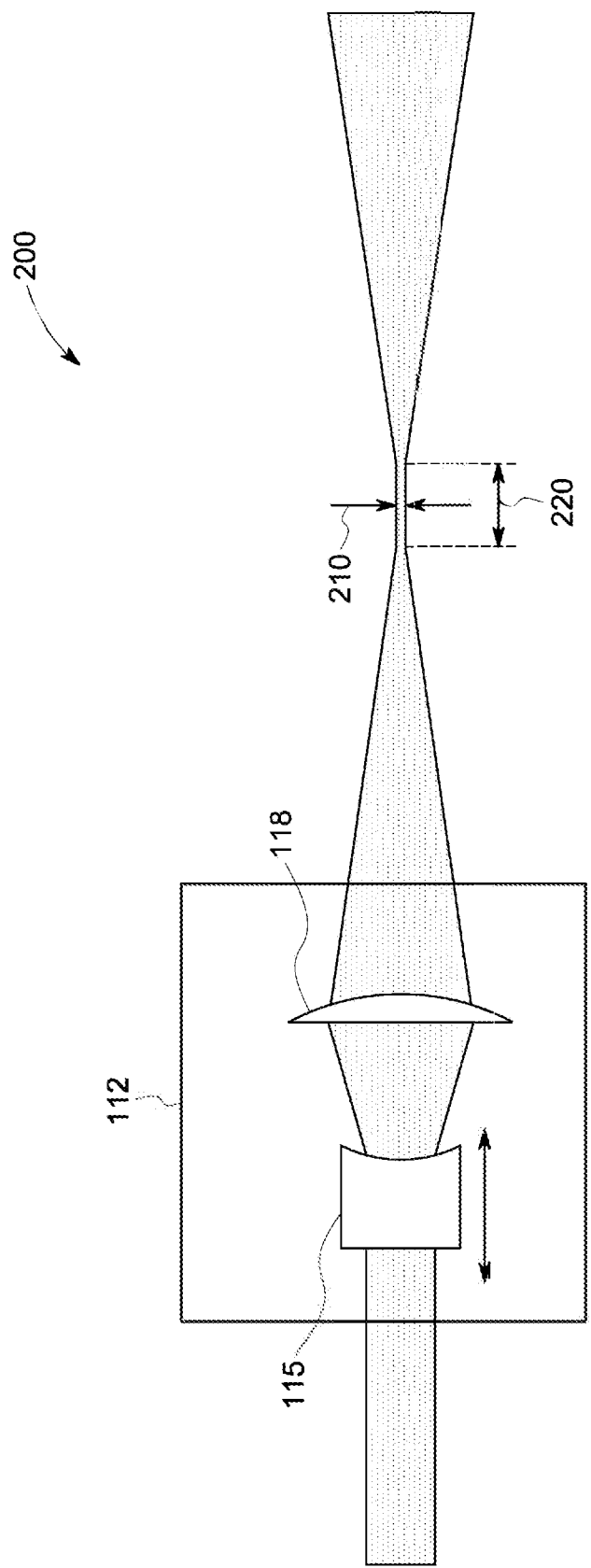
FIG. 2 depicts a laser beam generated by the conventional DMLM machine of FIG. 1.

Embodying systems and methods generate a type of non-gaussian beam that can be used to melt and process powder in an additive manufacturing machine. Conventional approaches to providing a laser beam suitable for additive manufacturing generates a traditional gaussian optics using beam shaping methods. Embodying systems and methods convert a traditional gaussian beam (the product of spherically shaped optics) into a non-diffracting optical beam profile pattern that is created by the superposition of two or more collimated beams.

A laser beam profile, suitable for use in the laser consolidation of a powder bed, generated by embodiments does not require extensive calibration and is insensitive over a large range of positional variations between the laser scanning system, the build plate, and the powder height. The energy distribution of this non-diffracting beam is tailored to provide an optimal peak-to-sidelobe intensity ratio using a set of non-gaussian optical elements, such as right circular prisms, which results in optimal powder melting and consolidation.

The non-diffracting beam profile is truncated to provide an extended outer portion of the beam of enough intensity to preheat a region of the powder bed prior to exposing that region to a central beam portion having greater intensity sufficient to cause actual melting. This ability to preheat the powder prior to melting is instrumental in the processing of crack prone alloys to mitigate the cracking. The laser beam generated by embodying systems and methods is insensitive to position once tuned and requires no calibration procedures. This embodiment-generated laser beam ensures that all points across the build plate receive the same energy distribution, and therefore melt uniformly.

Conventionally-generated collimated beams can be achieved with a single element, or an optical train of multiple elements placed a focal distance from the exit aperture of a fiber-optic laser source. A well-collimated beam can propagate long distances without changing its distribution of energy either in transverse or sagittal planes. In accordance with embodiments, this beam profile can be dynamically adjusted by altering the spacing between elements of the optical train. To create an embodiment-generated beam shape, portions of the collimated beam are bent to constructively and destructively interfere with other portions of the overall beam.

In accordance with embodiments, these interference patterns can be achieved with a right-circular prism (or axicon lens). The prism can be refractive, reflective, or some combination of the two. The resulting interference pattern generates an intensity profile that can be described mathematically as the superposition of Bessel beams. In implementation, the finite extent of the beam can be tuned. A true Bessel beam has infinite extent and would require tremendous energy to produce. Embodiments can combine two, three, or more prism elements in cascade to achieve tuning of the beam's spatial extent. An embodiment-generated beam can have its ratio of central peak energy to peripheral energy tailored to be optimal for melting powder. For example, a pair of steeply-angled prisms can convert a collimated beam into a collimated ring; then as the collimated ring passes through a small angle prism element it is converted to an overlapping Bessel beam.

An embodiment-generated non-diffracting laser beam provides a unique way of melting powder. The Bessel-type beam is comprised of a series of concentric rings, with each ring representing a fraction (about 5-25%) of the total energy level in the laser beam. In accordance with embodiments, the energy of the distribution function central lobe can be tuned to provide an intensity to melt the powder. The surrounding concentric rings can be tuned to preheat the powder prior to being exposed to the central lobe. This preheating can reduce spatter by reducing thermal gradients, which can prevent cracking in hard to weld alloys. Further the preheat regions can be used to sinter powder to prevent movement during subsequent melting processing.

Embodiment-generated Bessel beams can be generated by controlling the energy level distribution between the beam's central portion and sidelobes. This control can be attained by controlling velocity (dwell time) across the powder bed in combination with beam forming techniques. Embodiments are not limited to any particular type of laser source or method of generating the original beam. A DMLM machine that includes an embodiment-generated non-diffracting laser beam does not require the extensive tuning, software-based calibration, and regular adjustments of conventional DMLMs because of the beam's insensitivity to spatial variances present in DMLMs.

An embodiment-generated beam is non-diffracting and does not require focusing to achieve correct energy distribution. Elimination of a focusing system increases DMLM throughput, resulting in decreased expenditure of time and money during the manufacture, installation, calibration, and maintenance of a DMLM machines. Further, elimination of a focusing stage reduces the overall cost to produce the DMLM machine.

An embodiment-generated beam is insensitive to position across the build plate (x, y) and along its z-axis. The same beam generation system can be used on large and small machine sizes. The large spatial extent and ratio-centric nature of the energy distribution of an embodiment-generated beam provides advantages for difficult to weld materials, grain size and structure control and spatter control—thus, producing cleaner welds than conventionally-generated beams.

Figure 3:
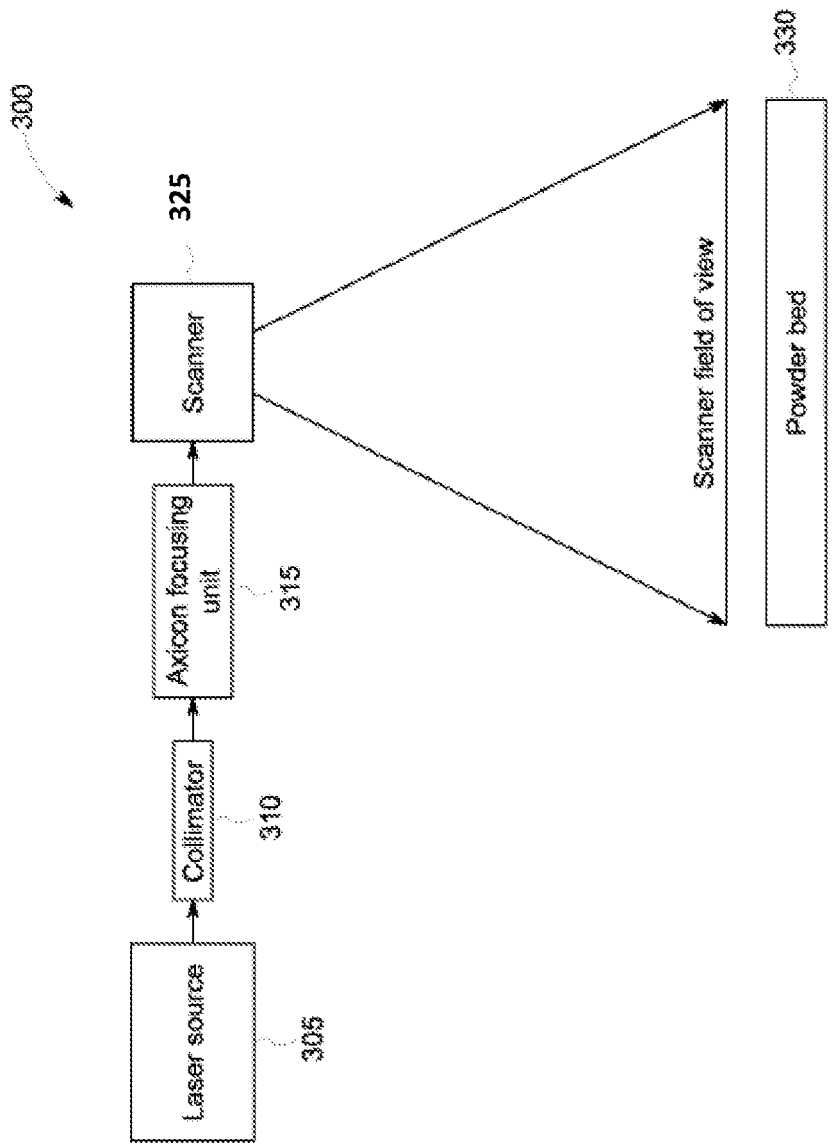
FIG. 3 schematically depicts a DMLM machine equipped with an axicon focusing unit in accordance with embodiments.

FIG. 3 schematically depicts DMLM machine 300 equipped with axicon focusing unit 315 in accordance with embodiments. Collimator 310 forms a parallel beam from laser light provided by laser source 305. Scanner 325 scans the beam in an x-y plane across powder bed 330. In accordance with embodiments, axicon focusing unit 315 contains optical elements that are in fixed relation to each other and immoveable at a predetermined displacement between the optical elements. An embodying axicon focusing unit replaces both dynamic optics unit 112 and F-Theta lens 127, which are required in conventional DMLM machines to produce proper welds.

Figure 4:
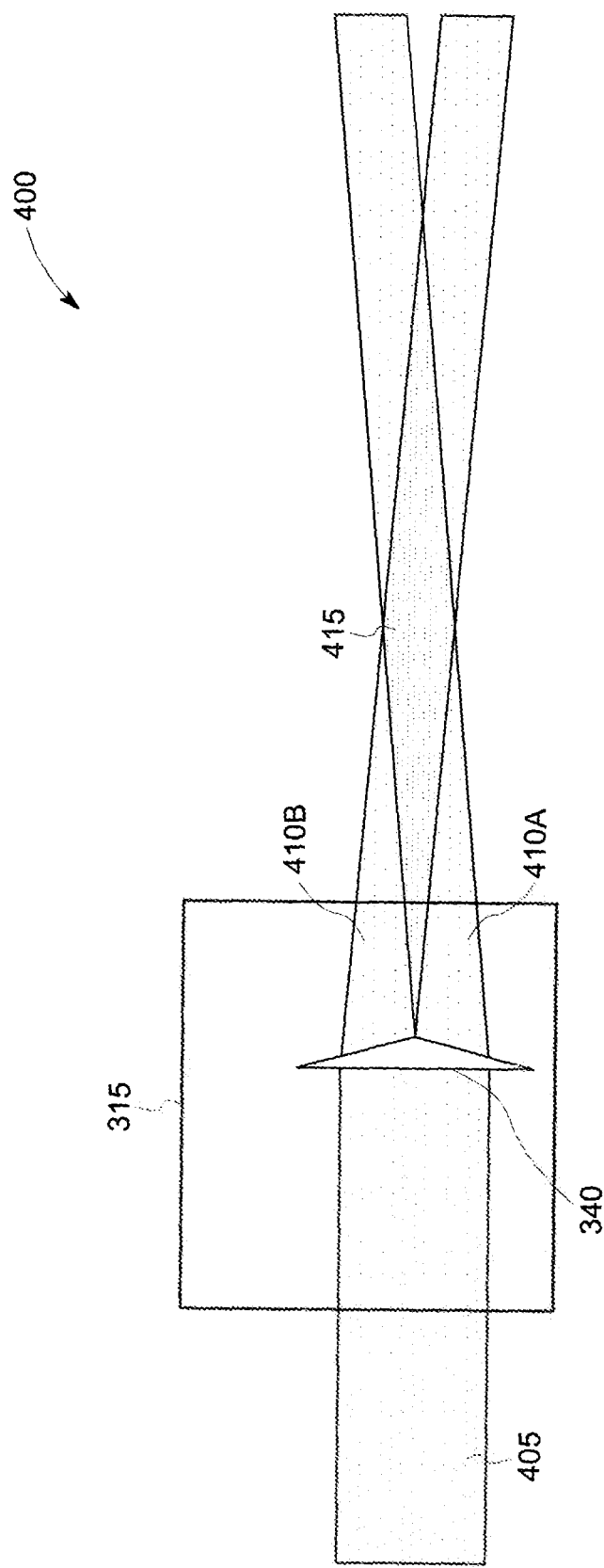
FIG. 4 depicts a laser beam generated by an axicon focusing unit having a single axicon optical element in accordance with embodiments.

FIG. 4 depicts laser beam 400 generated by axicon focusing unit 315 with axicon lens 340 in accordance with embodiments. Laser beam 400 is a simplified non-diffracting Bessel beam formation for laser micro welding in a DMLM machine process. Collimated beam 405 is provided to axicon focusing unit 315, which has axicon lens 340 positioned in the collimated beam's path. The axicon lens bifurcates the collimated beam into deflected collimated beam sections 410A, 410B. These two collimated beam sections merge at a distance distal from the axicon lens to form interference pattern region 415.

The axicon focusing unit depicted in FIG. 4 can generate an interference pattern propagation area along the z-axis that has a length in the range of about 100 mm to 1000 mm. In accordance with embodiments, reduction of the interference pattern area's length can concentrate more energy into the interference pattern. For DMLM machine applications, the interference pattern area's length needs not to be in that range—typical application can benefit with a beam waist length in the range of about 5 mm to 25 mm. It should be readily understood that the beam waist length is not limited to any produced by embodiments is not so limited. Rather, the beam waist length can vary for different working distances. For example, for some implementations the beam waist length can be about 2-5% of the working distance for that machine implementation.

FIG. 5 depicts laser beam 500 generated by axicon focusing unit 315 having a first set of optic elements in accordance with embodiments. An embodying axicon focusing unit can produce a beam with a beam waist length in the range of about 5 mm to 25 mm, which results in a DMLM machine having a beam impervious to errors introduced by thermal changes in the optical path, imprecise build plate movement, and inconsistent powder height. By introducing a reduction of its beam waist length, beam 500 has more energy concentrated in its interference pattern region than beam 400. This concentration of energy is a result of moving energy from the beam's sidelobes into its central region (i.e., center lobe and near-in sidelobes).

Collimated beam 505 is provided to axicon focusing unit 315, which has a pair of lenses 350, 352 are in a fixed relation to each other and immoveable. The lenses are positioned in the collimated beam's path. This pair of lenses forms annular beam 510. Lenses 350, 352 are displaced at a predetermined fixed distance D apart. Selection of the magnitude of the lens' displacement changes the annular beam's diameter to result in a change in the beam waist length of the interference pattern. The annular beam is bifurcated by axicon lens 354 to generate two deflected collimated beam sections 512A, 512B. These two collimated beam sections merge at a distance distal from the axicon lens to form interference pattern region 515.

FIG. 6 depicts laser beam 600 generated by axicon focusing unit 315 having a second set of optic elements in accordance with embodiments. Collimated beam 605 is provided to axicon focusing unit 315, which includes beam splitter 360 in the optical beam's path to create two beams 208A, 208B that follow two separate optical paths within axicon focusing unit 315. The beam split ratio can be varied to achieve different energy intensity levels in interference pattern region 615.

The first optical path includes a pair of axicon lenses 370, 372 that are displaced apart by a predetermined, fixed distance. The lenses are positioned in the collimated beam's path. This pair of lenses forms annular beam 610. Selection of the magnitude of the lens' displacement changes the annular beam's diameter to result in a change in the beam waist length of the interference pattern. Axicon lens 374 is an annulus structure defining an aperture. This annulus axicon lens is in the path of annular beam 610. The annular beam is bifurcated by axicon lens 374 to generate two deflected collimated beam sections 612A, 612B. These two collimated beam sections merge at a distance distal from the axicon lens to contribute to the energy level of interference pattern region 615.

The second optical path can include three right angle reflectors 362, 364, 366 that direct beam 608A along the second optical path so that beam 608A and beam 608B are isolated from each other within axicon focusing unit 315. In accordance with implementations, the number of beam splitters, reflectors (and angle of reflection) can vary. Beam 608A passes through the aperture defined by axicon lens 374. Axicon lens 380 is in the second optical path, in a portion of the path that passes through the aperture of axicon lens 374. Lens 380 focuses beam 608A so that it converges with beams 612A, 612B in interference pattern region 615 to contribute to focus spot energy level.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A system comprising:
a focusing unit comprising a beam splitter, the focusing unit in optical communication with a collimated laser beam, the focusing unit operable on the collimated laser beam to form an annular beam;
an axicon lens located distal from the beam splitter, the axicon lens located along the propagation direction of the annular beam, the axicon lens operable to bifurcate the annular beam into two deflected collimated laser beam sections, the axicon lens having a focus operable to cause the two deflected collimated laser beam sections to merge at a distance distal from the axicon lens to create an interference pattern region directed towards a powder bed for powder consolidation in the powder bed; and
an additive manufacturing machine beam scanning unit in optical communication with the two deflected collimated laser beam sections at a position between the axicon lens and the interference pattern region.

2. The system of claim 1, wherein the beam splitter creates two beams that follow two separate optical paths within the focusing unit.

3. The system of claim 2, wherein a beam split ratio of the beam splitter is variable to vary energy intensity levels in the interference pattern region.

4. The system of claim 2, wherein the axicon lens is an annulus structure defining an aperture.

5. The system of claim 2, wherein a first optical path of the two separate optical paths is through the first group of optic lenses forming a first beam of the two beams, the first beam being the annular beam.

6. The system of claim 2, wherein a second optical path of the two separate optical paths comprises a plurality of reflectors.

7. The system of claim 6, wherein the plurality of reflectors comprises a right angle reflector.

8. The system of claim 6, wherein the plurality of reflectors reflect a second beam of the two beams along the second optical path through an aperture of the axicon lens.

9. The system of claim 8, wherein the second beam passing through the aperture of the axicon lens is focused by a focusing lens.

10. The system of claim 9, wherein the second beam is focused by the focusing lens to converge with the first beam in the interference pattern region.

* * * * *